UNITED STATES PATENT OFFICE.

THOMAS TYRER, DECEASED, BY PERCY HOLLAND CHAMBERS AND GEORGE THOMAS FEASEY, EXECUTORS, OF LONDON, ENGLAND.

PRODUCTION OF CELLULOSE-ACETATE SOLUTIONS.

1,339,728.  Specification of Letters Patent.  Patented May 11, 1920.

No Drawing.  Application filed March 28, 1919.  Serial No. 285,908.

*To all whom it may concern:*

Be it known that we, PERCY HOLLAND CHAMBERS, solicitor, and GEORGE THOMAS FEASEY, chartered accountant, both subjects of the King of Great Britain and Ireland, residing at London, England, are executors of the last will and testament of THOMAS TYRER, deceased, late subject of the King of Great Britain and Ireland, and that the late THOMAS TYRER has invented new and useful Improvements in the Production of Cellulose-Acetate Solutions, of which the following is a specification.

The present invention relates to improvements in the manufacture of aeroplane dopes, and cellulose acetate solutions.

It is well known that one of the most suitable solvents for cellulose acetate is tetrachlorethane or acetylene tetrachlorid. It is generally assumed that the suitability of this substance as a solvent for cellulose acetate is due to its action of preventing cellulose acetate solutions from drying white, especially in wet weather. However owing to the toxic nature of tetrachlorethane and similar chlorinated derivatives of aliphatic hydrocarbons their use had to be restricted.

A number of solvents for cellulose acetate have been proposed for the purpose of replacing tetrachlorethane and the like chlorinated products, such as for instance, benzyl alcohol.

Although these substitutes have the property of preventing cellulose acetate solutions from drying white even in wet weather, they have the disadvantage that owing to their relatively high boiling point (benzyl alcohol for instance boils at 206° C.) the solution dries more slowly than when tetrachlorethane is used, consequently the doping takes longer.

Moreover when these substitutes such as benzyl alcohol are used a certain minimum amount is necessary to prevent cellulose acetate solutions from drying white.

According to the present invention benzyl alcohol, tolyl carbinol and the like substitutes for acetylene tetrachlorid are replaced by cyclohexanone.

The invention consists in admixing with cellulose acetate solutions, cyclohexanone or other cycloketones such as cyclopentanone or the alkyl or aryl substitution products of cycloketones, in quantities less than the amount of cellulose acetate used.

Cyclohexanone and other cycloketones are well known solvents for acetone-soluble cellulose acetate, either alone or in conjunction with other known solvents for cellulose acetate. The solubility of cellulose acetate in cyclohexanone varies with the temperature at which the solution is effected. Thus it is possible to prepare on the water bath, without the use of any other solvent, a 10% solution of cellulose acetate in cyclohexanone which remains perfectly clear at ordinary temperature.

At ordinary temperature (15° C.) it is not possible to prepare a higher than 4% solution of cellulose acetate in cyclohexanone without any other solvents, and at about 30° C., 5% solutions can be easily prepared.

Whereas for dissolving 4 lbs. of cellulose acetate, at ordinary temperature at least 96 lbs. cyclohexanone are required to give a clear solution, for the purpose of the present invention, only 0.05 lbs. of cyclohexanone for 4 lbs. of cellulose acetate are required, or about $\frac{1}{2000}$ part of the amount required to make a 4% solution. The cyclohexanone used in the present invention has therefore no effect on dissolving the cellulose acetate and it is necessary to use other liquids to effect complete solution of the cellulose acetate.

Inasmuch as the boiling point of cyclohexanone is only slightly higher than that of tetrachlorethane *i. e.* about 155° C. as compared with 147° C. the aforesaid disadvantage of slow drying, when other substitutes for acetylene tetrachlorid are used, is obviated.

Apart from the closeness of the boiling points and consequently the approximately equal rate of drying of acetylene tetrachlorid dope and dope containing cyclohexanone another important advantage in the use of cyclohexanone as compared for instance with benzyl alcohol is that the amount of cyclohexanone needed is only about $\frac{1}{10}$ that of benzyl alcohol.

In practice to prevent dope from drying white we have found that for a quantity of 300 gallons dope containing about 200 lbs. of cellulose acetate only 0.25 ($\frac{1}{4}$) gallon of cyclohexanone is required, whereas the minimum amount of benzyl alcohol required would be 2 gallons and in most cases even more. It is self evident that a dope containing 2 gallons of a vehicle boiling at 206° C. will take longer to dry than a dope containing only ¼ gallon of a vehicle boiling at 155° C. i. e. 50° below the first vehicle.

The other ingredients of the dope may be a solvent or solvents for cellulose acetate or a solvent or solvents plus a non-solvent or non-solvents or a mixture of non-solvents which together are capable of dissolving cellulose acetate with or without a solvent or solvents. In addition camphor substitutes and/or softening agents may be added and the amount of the ingredients may be varied at will without departing from the spirit of the invention once it has been recognized that a very minute quantity of cyclohexanone which itself would be far from sufficient to dissolve the cellulose acetate, is capable of preventing the dope from drying white and does not materially interfere with the rate of drying as compared with acetylene tetrachlorid dopes.

Instead of using cyclohexanone we may use other cycloketones, such as cyclopentanone or the alkyl or aryl substitution products of cycloketones.

The cellulose acetate solutions produced according to our invention may be used for other purposes than aeroplane doping.

What we claim and desire to secure by Letters Patent of the United States is:—

1. In the production of cellulose acetate solutions for aeroplane and other purposes, the admixture of a quantity of a cycloketone less than 2% of the amount of cellulose acetate used.

2. In the production of cellulose acetate solutions for aeroplane and other purposes, the admixture of a quantity of cyclohexanone less than 2% of the amount of cellulose acetate used.

PERCY HOLLAND CHAMBERS,
GEORGE THOMAS FEASEY,
*Executors of Thomas Tyrer, deceased.*